(12) United States Patent
Holt et al.

(10) Patent No.: US 9,714,342 B2
(45) Date of Patent: Jul. 25, 2017

(54) PARTICLE SUSPENSIONS OF FLOCCULATING POLYMER POWDERS

(71) Applicant: PSMG, LLC, Woodstock, GA (US)

(72) Inventors: Jason Holt, Ball Ground, GA (US); Malcolm Barry Lindler, Alpharetta, GA (US)

(73) Assignee: PSMG, LLC, Ball Ground, GA (US)

( * ) Notice: Subject to any disclaimer, the term of this patent is extended or adjusted under 35 U.S.C. 154(b) by 645 days.

(21) Appl. No.: 13/973,746

(22) Filed: Aug. 22, 2013

(65) Prior Publication Data
US 2015/0053623 A1 Feb. 26, 2015

(51) Int. Cl.
*B01D 21/01* (2006.01)
*C02F 1/52* (2006.01)
*C08L 71/02* (2006.01)
*C02F 1/56* (2006.01)
*C08K 5/06* (2006.01)
*B03D 3/00* (2006.01)
*C02F 103/16* (2006.01)
*C02F 103/28* (2006.01)

(52) U.S. Cl.
CPC .............. *C08L 71/02* (2013.01); *C02F 1/56* (2013.01); *C02F 2103/16* (2013.01); *C02F 2103/28* (2013.01); *C08L 2201/54* (2013.01)

(58) Field of Classification Search
None
See application file for complete search history.

(56) References Cited

U.S. PATENT DOCUMENTS

| 3,288,770 A | * | 11/1966 | Butler ................ C02F 1/52 210/735 |
| 3,763,071 A | * | 10/1973 | Katzer et al. ........... C08J 3/09 524/210 |
| 3,843,589 A | | 10/1974 | Wartman |

(Continued)

FOREIGN PATENT DOCUMENTS

CA 2023735 C 2/1992
EP 0203817 12/1986
(Continued)

OTHER PUBLICATIONS

Archer, Sorbitol Solution, USP/FCC, p. 1, accessed online May 5, 2016.*
(Continued)

*Primary Examiner* — Clare Perrin
(74) *Attorney, Agent, or Firm* — Christensen, Fonder, Dardi & Herbert PLLC; Peter S. Dardi; Kayla Fossen

(57) ABSTRACT

Flowable liquid suspensions are described comprising blends of particulate water soluble high molecular weight polymer flocculants. The polymer flocculants can include polyethylene oxide, polyacrylamide, polyDadmac, Dadmac-acrylamide copolymers, copolymers thereof and combinations thereof. The suspension allows the use of fine powders while reducing potential air quality and safety issues. The suspensions generally settle when mixing is stopped, but a uniform dispersion results when the suspensions are mixed, and the mixed suspensions can be delivered for use. The flocculant suspensions can be used for waste water purification, fiber dewatering, and the like.

17 Claims, 2 Drawing Sheets

(56) References Cited

U.S. PATENT DOCUMENTS

| | | | |
|---|---|---|---|
| 3,849,361 A * | 11/1974 | Zweigle et al. | C08J 3/03 524/376 |
| 3,960,584 A | 6/1976 | Savage | |
| 3,985,651 A * | 10/1976 | Newman | C02F 1/5227 210/734 |
| 4,522,956 A * | 6/1985 | Dhabhar | A61K 6/0026 106/35 |
| 4,710,298 A | 12/1987 | Noda et al. | |
| 4,795,531 A | 1/1989 | Sofia et al. | |
| 4,931,190 A | 6/1990 | Laros | |
| 5,102,455 A | 4/1992 | Allen et al. | |
| 5,112,500 A | 5/1992 | Jones | |
| 5,178,770 A * | 1/1993 | Chung | C02F 1/24 162/189 |
| 5,342,538 A | 8/1994 | Chung et al. | |
| 5,366,622 A | 11/1994 | Geyer | |
| 5,449,464 A | 9/1995 | El-Shall | |
| 5,549,820 A | 8/1996 | Bober et al. | |
| 5,650,465 A | 7/1997 | Ryan et al. | |
| 6,123,856 A | 9/2000 | Kumpera et al. | |
| 6,238,486 B1 | 5/2001 | Dunham et al. | |
| 6,358,364 B2 | 3/2002 | Keiser et al. | |
| 6,846,416 B2 | 1/2005 | Nasu et al. | |
| 6,979,405 B2 | 12/2005 | Weir | |
| 7,252,783 B2 | 8/2007 | Weir et al. | |
| 2005/0061750 A1 | 3/2005 | Fabri et al. | |
| 2005/0115907 A1 | 6/2005 | Taylor | |
| 2010/0038319 A1 | 2/2010 | Boehm et al. | |
| 2010/0213405 A1 | 8/2010 | Wensloff | |
| 2014/0158634 A1 | 6/2014 | Holt | |

FOREIGN PATENT DOCUMENTS

| | | |
|---|---|---|
| EP | 0522334 | 11/1995 |
| EP | 0536194 | 11/2001 |

OTHER PUBLICATIONS

Sigma ("Poly(ethylene glycol) and Poly(ethylene oxide)", accessed online Jul. 21, 2016, p. 1.*

Dow (POLYOX™ Water Soluble Resins, accessed online Nov. 10, 2016, pp. 1-16).*

Han et al. (J. Chem. Eng. Data, 2008, 53, 2598-2601).*

Han et al., "Density, Viscosity, and Excess Properties for Aquaeous Poly(ethykene glycol) Solutions (298.15 to 323.15) K," Journal of Chemical & Engineering Data, (Oct. 22, 2008), vol. 53(11):2598-2601.

International Search Report and Written Opinion for international application No. PCT/US14/48150 dated Mar. 20, 2015 (9 pages).

Ecolab USA Inc., PARETO Mixing Technology brochure, © 2012, 9 pages.

Scheiner et al., "Dewatering of mineral waste using the flocculant polyethylene oxide," Bulletin/U.S. Dept. of the Interior, Bureau of Mines; 681 (1985).

Smelley at al., "Synergism in polyethylene dewatering of phosphatic clay waste," U.S. Dept. of the Interior, Bureau of Mines, 1980.

Extended European Search Report for European Application No. 14837357.4 Dated Feb. 9, 2017 (6 pages).

Examination Report for standard patent Australian Application No. 2014309314 dated Mar. 2, 2017 (3 pages).

* cited by examiner

PARTICLE SUSPENSIONS OF FLOCCULATING POLYMER POWDERS

FIELD OF THE INVENTION

The invention relates to suspensions of polymer particles in a non-dissolving liquid, in which the polymers are generally suitable as flocculants for waste water treatment. The invention further relates to use of flocculent particle suspensions for the treatment of waste water.

BACKGROUND OF THE INVENTION

Various waste streams have particulate contaminants that should be removed or concentrated for proper disposal. Traditionally, ponds have been used for dewatering the sludge or slime, but ponding is undesirable due to large areas of lands needed as well as associated environmental, economic, aesthetic and safety reasons. Addition of flocculants to the waste stream can facilitate concentration of particulate wastes. In particular, phosphate mining produces clay and clay like particulates. Economic constraints drive the use of flocculants with respect to efficiency and cost of the processing. Flocculants can also be effectively used in paper mill operations with respect to treatment of wastewater as well as a sheet formation aid or other application for dewatering fibers.

SUMMARY OF THE INVENTION

In the first aspect, the invention pertains to a flowable liquid suspension comprising particulate water soluble flocculant polymer having a molecular weight of at least about 200,000 g/mol and a liquid polyether polyol having a molecular weight from about 150 g/mol to about 1,000 g/mol and a viscosity of the polyether polyol alone at 25° C. of no more than about 500 cP. Generally, the flowable liquid suspension has a concentration of flocculant polymer from about 1 weight percent to about 60 weight percent and at least about 40 weight percent polyether polyol and the flocculant polymer is not dissolved in the suspension.

In further aspects, the invention pertains to a flowable liquid suspension comprising from about 1 weight percent to about 60 weight percent particulate polyDadmac, polyDadmac copolymer or a mixture thereof and a liquid polyether polyol having a molecular weight from about 150 g/mol to about 1,000 g/mol. Generally, the particulate polyDadmac, polyDadmac copolymer or a mixture thereof is not dissolved in the suspension.

In additional aspects, the invention pertains to a method for using a flocculating polymer. The method generally comprises delivering a particulate flocculant polymer suspension from a reservoir with a mixer into an aqueous solution at a selected concentration, wherein the flocculant polymer suspension comprises particulate water soluble flocculant polymer having a molecular weight of at least about 200,000 g/mol and a liquid polyether polyol having a molecular weight of at least about 150 g/mol. Generally, the flowable liquid suspension has a concentration of flocculant polymer from about 1 weight percent to about 60 weight percent and the flocculant polymer settles from the suspension to form a non-uniform liquid if not mixed. The use of the flocculant polymer suspension can be directed to waste water purification, fiber dewatering, similar application of particulate removal from aqueous solutions, and the like.

DETAILED DESCRIPTION

Figure 1:
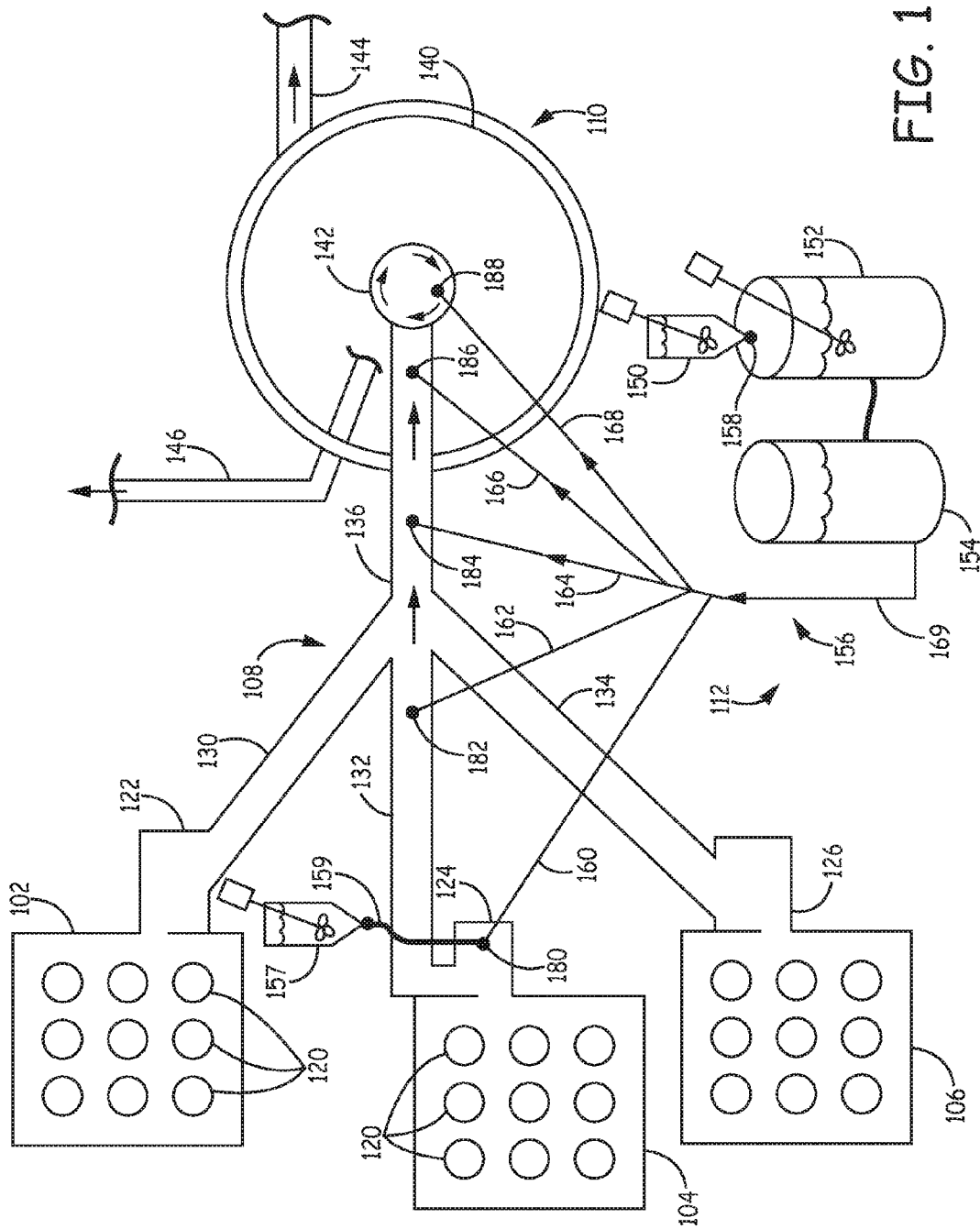
FIG. 1 is a top schematic view of the layout of a waste treatment facility involving the delivery of a polymer flocculant into a waste stream from mineral processing stations as the tailings, i.e., the waste stream, flow to a thickening tank (thickener).

A convenient format has been developed for the delivery of small particles of a flocculating polymer as a suspension in moderate molecular weight polyethylene glycol and/or polypropylene glycol liquid. The suspension generally has a relatively high quantity of polymer particulates for efficient delivery of the polymer particles. Flocculating polymers, such as polyethylene oxide, polyacrylamide, polyDadmac, Dadmac-acrylamide copolymers and combinations thereof, are generally high molecular weight water soluble polymers that can be effectively used for water quality treatment and the like. The polymer particles generally are water soluble and essentially insoluble in the liquid of the suspension, so that relatively high concentrations of the polymer can be suspended without gelling, which can increase the viscosity to undesirable levels. Handling and shipping of fine powders can be problematic for many reasons including, among others, potential air quality and safety issues. These handling and safety issues can be particularly problematic at points of delivery where flocculant chemicals are delivered from suitable storage containers, generally without access to sophisticated handling equipment and highly skilled technicians. The suspensions described herein can be adapted to simplify storage at production facilities, transportation using liquid handling containers and convenient delivery with reduced air quality issues. In some embodiments, the suspensions can be mixed at point of delivery and metered into a waste water flow that then proceeds to a settling tank or the like where the flocculating polymers settle for separation from the water. Similarly, the suspension can be used to deliver flocculating polymers for fiber dewatering both for waste water treatment and paper formation.

Polymers generally used as flocculants are water soluble high molecular weight compositions. While the polymers are generally water soluble, the flocculants tend to agglomerate and form colloids at appropriate concentrations in water, which may be driven at least in part by the presence of particulate or fibrous contaminants in the wastewater. Due to colloid formation and agglomeration, the flocculants with trapped impurities can settle from the flow. As described further below, settling tanks can be used to separate flocculants with trapped impurities from the liquid so that purified water can be separated from agglomerated flocculants/waste, which can be separately removed for further processing.

Polyethylene oxide is typically supplied as a fine free flowing powder used for the manufacture of a number of different pharmaceutical and personal care applications. Commercially, there are a few various grades of polyethylene oxide particle sizes available to end users. In manufacture, some polyethylene oxide powders are screened to remove the unwanted, extremely fine polyethylene oxide powder (fines). In the end use application, the extremely fine properties of the screened fines make handling difficult. The dust further limits the by-products' end uses. The suspensions described herein provide a convenient and safe approach for the effective use of ultrafine polymer particles. Based on the discovery of the convenient approach for the delivery of PEO powders, this approach has been found to be similarly convenient for the delivery of other high molecular weight flocculating polymers.

The suspensions comprise solid and liquid components. In particular, with respect to solid components, the suspensions generally can comprise from about 5 weight percent to about 60 weight percent flocculant polymer particles, in further embodiments from about 10 weight percent to about 55 weight percent, and in additional embodiments from about 12 weight percent to about 50 weight percent flocculant polymer particles. The liquid of the suspension generally comprises a liquid polyether polyol, e.g., diol or triol, with oxyethylene repeat units along the polymer backbone, which generally have moderate molecular weights, such as polyethylene glycol (PEG, HO—($CH_2$—$CH_2$—O—$)_n$H), propylene glycol (PPG, HO—($CH_2$—$CHCH_3$—O—$)_n$H), copolymers thereof or a mixture thereof (PEG/PPG) as the primary component or only component. PEG and PPG are ethers with two terminal hydroxyl groups and can be moderately viscous compositions, which influences the viscosity of the suspension. Glyceryl ether polymers are commercial polymers with PEG or PPG reacted with a glycerine molecule to form an ether linkage with the resulting molecule having three terminal hydroxyl groups. (Dow®, PT-series of polymers). Specifically, the liquid of the suspension can comprise at least about 75 weight percent, in further embodiments at least about 80 weight percent and in additional embodiments at least about 90 weight percent PEG/PPG. Polymers generally have a distribution of molecular weights, and the PEG generally has an average molecular weight from about 200 g/mole to about 700 g/mole and in further embodiments from about 300 g/mole to about 650 g/mole. PEG 400 (average molecular weight 380-420), PEG 600 (average molecular weight 580-620) and mixtures thereof can be effectively used. Polypropylene glycols can have suitable viscosities at average molecular weights in the several thousands, and are commercially available, for example, from Dow Chemical. Glyceryl ether polymers with three terminal hydroxyl groups are similarly commercially available with similar viscosities and other properties. Also, copolymers ethylene oxide and propylene oxide are commercially available. The liquid can be selected to not significantly dissolve the polymer particles. While the suspensions can consist essentially of flocculant polymer particles and liquid polyether glycol, e.g., PEG/PPG, other minor components can be included in the suspension if desired to modify the properties of the suspension, such as coloring agents, viscosity modifiers, surfactants, or the like, generally in amounts of no more than about 5 weight percent each.

Polyethylene glycol (PEG), polyethylene oxide (PEO), or poly(oxyethylene) (POE) refers to an oligomer or polymer of ethylene oxide. The three names are chemically synonymous, but historically PEG has tended to refer to oligomers and polymers with a molecular mass below 20,000 g/mol, PEO to polymers with a molecular mass above 20,000 g/mol, and POE to a polymer of any molecular mass. PEG compositions can be liquids or low melting solids, depending on the molecular weights of the polymer. PEG 400 generally refers to a PEG formulation with an average molecular weight between 380 g/mole and 420 g/mole. PEG 400 is commercially available, for example, as Dow CARBOWAX™ PEG 400. PEG 600 generally refers to a PEG formulation with an average molecular weight between 570 g/mole and 630 g/mole. Above a molecular weight of roughly 800 g/mole, PEG can be a waxy paste like material at room temperature.

Polyethylene oxide can be represented by the formula H—(O—$CH_2$—$CH_2)_n$—OH, where n refers to the degree of polymerization, and for high molecular weight polymers, n is large. Low molecular weight variations of this polymer can be called polyethylene glycol or PEG. The nature of the polymer can be characterized by the average molecular weight and suitable polymers can be linear or branched. In general, the average molecular weight of the polyethylene oxide can be at least about 1 million g/mol, in other embodiments at least about 3 million g/mol, and in additional embodiments from about 4 million g/mol to 11 million g/mol. A person of ordinary skill in the art will recognize that additional ranges of polyethylene oxide (PEO) molecular weight within the explicit ranges above are contemplated and are within the present disclosure. Suitable commercial high molecular weight polyethyelene oxides are available from Dow Chemical, for example, Polyox WSR™ 308 or UCARFLOC™ 309, 304, etc. Particles of high molecular weight PEO in commercial distribution generally have an average particle diameter of roughly 150 microns, and the particle may be sieved to reduce the presence of small particles, such as particles with a diameter less than about 75 microns. These commercial PEO materials can be conveniently distributed in the suspensions described herein. Based on the suspensions described herein, polymer particles with a small average particle diameter as well as mixtures of particles with various particle sizes can be conveniently handled. In some embodiments, the PEO particles can comprise at least about 10 weight percent particles with a particle diameter of no more than about 75 microns, in further embodiments at least about 60 weight percent with a particle diameter of no more than about 75 microns and in other embodiments at least about 10 weight percent with a particle diameter no more than about 50 microns. A person of ordinary skill in the art will recognize that other particle size distributions within the explicit ranges above are contemplated and are within the present disclosure.

Polyacrylamide is represented by the formula —($CH_2CH(CONH_2))_n$—, which is an amide form of polyacrylic acid. Copolymers of acrylamide can be similarly referred to as an acrylamide, and various copolymers introduce an ionic character into the polymer. For example, some polyacrylamides are copolymers of acrylamide and acrylic acid. Thus, a polyacrylamide can be non-ionic, anionic, cationic or amphoteric, and generally these various forms of polyacrylamide are suitable for forming the synergistically improved flocculant compositions. Charged polyacrylamides can be designed with varying amounts of copolymers constituents to vary the amount of charge, e.g., with charged monomers generally varying from about 10 to about 50 percent of the polymer chain. The lab bench results below suggest that the charge is not a significant parameter for the flocculant function of the polyacrylamides in the polymer blends. In general, anionic polyacrylamides have found use in the waste stream treatment process. The molecular weight of the polyacrylamide has been found to be a significant aspect with respect to the discovered improvement of the polymer blends. In particular, it is generally desirable for the polyacrylamide to have a higher average molecular weight relative to the average molecular weight of the polyethylene oxide. Generally, the polyacrylamide has an average molecular weight of at least about 16 million g/mol, in further embodiments at least about 18 million g/mol, and in further embodiments at least about 19 million g/mol, and particularly improved results have been discovered for polyacrylamides with an average molecular weight of at least 22 million g/mol, in further embodiments at least about 22.5 g/mol, in some embodiments at least about 23 million g/mol, in additional embodiments at least about 24 million g/mol and in other embodiments at least about 25 g/mol. A person of ordinary skill in the art will recognize that additional ranges of molecular weights within the explicit ranges above are contemplated and are within the present disclosure. Suitable high molecular weight polyacrylamides are available commercially, for example, from Kemira™ (e.g., 130A 18-20M mw), SNF Floeger™ (e.g., 934VHM 20-22M mw) and Hengju Polymers (Hengflox™).

Recently it has been discovered that synergistic flocculant properties can be obtained form a blend of very high molecular weight PEO and polyacrylamides. For the desirable blends, in general, the polyethylene oxide has an average molecular weight of at least 1 million grams/mole (g/mol), and the polyacrylamide generally has an average molecular weight of at least about 22.5 million g/mol. Generally, the polymer blend has a weight ratio of polyethylene oxide to polyacrylamide from about 0.667 to about 5, in further embodiments from about 0.75 to about 4.5, in additional embodiments from about 0.85 to about 4.25, and in other embodiments from about 1 to about 4. Also, the polymer blend can comprise at least about 35 weight percent polyethylene oxide, in further embodiments from about 45 weight percent to about 90 weight percent, and in additional embodiments from about 50 weight percent to about 85 weight percent polyethylene oxide. A person of ordinary skill in the art will recognize that additional ranges within the explicit composition ranges above are contemplated and are within the present disclosure. These blends can be directly formed into the suspensions described herein for convenient shipping and delivery for use of the polymer blends. These blends of PEO and polyacrylamides are described further in copending U.S. patent application Ser. No. 13/861,901 to Holt, entitled "Polymer Blends for Flocculation," incorporated herein by reference.

PolyDadmac or polydiallyldimethylammonium chloride $((C_8H_{16}NCl)_n)$ is a cationic homopolymer that can be useful as a flocculant agent. Copolymers of Dadmac and acrylamides as well as other copolymers of Dadmac are similarly available commercially and are similarly suitable flocculant applications as an anionic, cationic or neutral copolymer. PolyDadmac and copolymers thereof generally can have an average molecular weight of at least about 100,000 g/mole, in further embodiments at least about 1,000,000 g/mole and can be desirable at average molecular weights of about 5,000,000 to 30,000,000 g/mole. PolyDadmac can be effectively provided in small particulate form, e.g., microbeads, or in larger particulate sizes, such as granules. For flocculant use, polyDadmac particles generally have an average particle diameter from about 0.5 microns to about 150 microns. A person of ordinary skill in the art will recognize that additional ranges of average particle diameter within the explicit ranges above are contemplated and are within the present disclosure. PolyDadmac generally can be dissolved in water at high concentrations as a viscous liquid without gel formation, but the suspensions described herein of polyDadmac can be desirable for flocculant applications. In particular, in contrast with some other flocculant polymers polyDadmac has been found to be more effective as a flocculant when added n particulate form directly into a waste stream without first dissolving in water. While the delivery of liquid polymer solutions is convenient from a handling perspective, the desirability of delivery of particulate polyDadmac into a waste water flow is described in European patent 0536194B to Payne et al., entitled "Purification of Aqueous Liquor," incorporated herein by reference. Through the delivery of the suspensions described herein, the convenience of liquid phase delivery can be combined with the advantages of the delivery of undissolved polyDadmac into the waste water flow.

The suspensions thus provide a mechanism for liquid delivery of the particulate polyDadmac to provide for desirable handling while obtaining the good performance provided by the particulate material. In the suspensions described herein, particles of polyDadmac or (Dadmacacrylamide) copolymers are similarly suspended in a non-dissolving fluid of polyether polyol, e.g., PEG/PPG. Additionally, blends of PEO and polyDadmac can be desirable with respect to the resulting flocculant properties. Generally, a polymer blend can have a weight ratio of polyethylene oxide to polyDadmac from about 0.667 to about 5, in further embodiments from about 0.75 to about 4.5, in additional embodiments from about 0.85 to about 4.25, and in other embodiments from about 1 to about 4. Also, the polymer blend of polyDadmac and PEO can comprise at least about 35 weight percent polyethylene oxide, in further embodiments from about 45 weight percent to about 90 weight percent, and in additional embodiments from about 50 weight percent to about 85 weight percent polyethylene oxide. A person of ordinary skill in the art will recognize that additional ranges within the explicit composition ranges above are contemplated and are within the present disclosure.

To achieve the desired purpose of the present suspension, the suspensions do not need to be stable and as a general matter may not be, although it is not problematic if the suspensions are coincidentally stable. Stability in this context is intended to mean that a well mixed suspension remains homogenous. In general, the suspensions separate with the solids concentrating toward the bottom of a container due to gravity. However, the suspensions can be mixed to form a homogenous suspension when desired, such as for delivery for a particular application, as described further below.

In contrast to the suspension described herein, stable suspensions of PEO have been described in U.S. Pat. No. 3,843,589 to Wartman (Wartman '589 patent), entitled "Stable Pumpable Slurries of Ethylene Oxide Polymers," incorporated herein by reference. To achieve the stable suspension, the Wartman '589 patent described a more complex liquid to achieve a suitable density, certain specific polymer parameters, a very high viscosity suspension In contrast, the present suspensions may not be stable, but they have significantly lower viscosities for easier delivery and simpler formulations. The liquids used for the suspensions generally have a viscosity at 25° C. in some embodiments of no more than about 400 centipoise (cP), in other embodiments no more than about 300 cP and in further embodiments no more than about 250 cP. The well blended suspension can have a viscosity at 25° C. of no more than about 1000 cP, further embodiments no more than about 850 cP and in additional embodiments no more than about 750 cP.

For use the flocculant polymers are generally diluted with water prior to delivery into the waste stream or other delivery stream. The polyether polyol generally mixes with water and the flocculant polymer generally dissolves. During the dissolving/make down step, the liquid state of the polymer suspension improves initial distribution of polymer particles compared to an equivalent dry fed product that may experience clumping during the wetting phase. Testing has shown that PEO particles delivered with the suspension into water results in rapid dissolving of the PEO, and it is expected that the other polymer should exhibit similar rapid dissolving. The suspension can be delivered from a suitable mixer to provide for delivery of a uniform composition, generally in selected metered amounts, and delivered into a container for dilution with water. The flocculant polymer compositions is generally formed into a dilute aqueous solution generally at a concentration from about 0.0005 to about 0.2 weight percent, in further embodiments from about 0.001 to about 0.1 weight percent and in additional embodiments from about 0.002 to about 0.05 weight percent flocculant polymer(s). A person of ordinary skill in the art will recognize that additional ranges within the explicit ranges above are contemplated and are within the present disclosure.

Flocculants are useful for the treatment generally of waste streams, generally from mines, to agglomerate particulates that can then settle from the waste stream and to facilitate concentration of the particulates. Mines generally produce flow of relatively dilute waste stream with tailings, also referred to as mineral slimes. To reasonably dispose of the mineral slimes, the concentration of particulates can be concentrated. The polymer flocculants described herein can be effective to form flocculants, for example, with clay, claylike waste or other silicate or metal oxide particulate waste, which can be produced in various mining operations, such as phosphate mining, bauxite mining, coal washing, dredging, talc mining, other sand mining deposits, alumina processing and the like. The dissolved polymer flocculants can be injected into the stream containing suspended solids that is then directed to a settling tank, or the like. Processing with the polymer flocculants is described further below.

With the use of a polyacrylamide flocculant and/or a polyDadmac flocculant, the flocculant is generally added in part early in the waste flow with optional additional portions added along the flow to drive a relatively slow flocculation process to a relatively effective end point. With the use of polyethylene oxide alone, it is generally desirable to add the flocculant essentially at or near the point of entry of the waste flow into a settling tank due to the relatively rapid flocculation effect. With respect to the polymer blends, the flocculant can be added upstream in the waste flow from the entry point into the settling tank or center well. Proper mixing of a polymer blend facilitates this earlier delivery without interfering with the desirable flow of the waste stream through conduits leading to a settling tank. The earlier delivery of flocculant provides for improved mixing within the waste flow, which can result in the reduced use of flocculant while improving the effectiveness of the flocculant. In particular, in some embodiments a polymer flocculant is added at least 10 meters upstream from a port, e.g., central inlet, into a settling tank.

A representative configuration of a waste treatment facility for the treatment of waste water with mining tailings is shown in FIG. 1. The waste treatment facility for a mining operation comprises mineral processing stations 102, 104, 106, slime flow conduit system 108, thickening tank 110 and polymer flocculant delivery system 112. The configuration of the mineral processing stations can depend on the particular mining operation, and these stations can comprise hydrocyclones 120 or the like or other suitable purification equipment to separate crudely purified mineral ore from slimes, i.e., dilute tailing waste from the mineral separation. In some embodiments, a mineral processing station can comprise a head box 122, 124, 126 to direct slime/waste flow from a mineral processing station to the waste flow conduit system. While FIG. 1 shows three mineral processing stations 102, 104, 106, in other embodiments a waste facility may interface with a single mineral processing station, two, four, five or more than five mineral processing stations.

Slime flow conduit system 108 provides for flow of the waste stream from mineral processing stations 102, 104, 106 to thickening tank 110, and generally slime flow conduit system 108 interfaces with polymer flocculant delivery system 112 at one or more points. With the configuration shown in FIG. 1, slime flow conduit system 108 comprises flow lines 130, 132, 134 that lead to combined flow line 136. Flow lines 130, 132, 134, respectively connect to head boxes 122, 124, 126 to receive slimes from mineral processing stations 102, 104, 106, respectively. The size and construction of flow lines 130, 132, 134, 136 can be designed based on the particular mining operation and corresponding waste volumes, and flow limes 130, 132, 134, 136 can be pipes, open or closed ducts or any other suitable flow structure. For a representative phosphate mining operation flow lines 130, 132, 134 can be pipes with a diameter of roughly 10-40 inches, and combined flow line 136 can be a pipe with a diameter of roughly 30-60 inches, but the basic teachings herein can apply to a range of processing operations and mining volumes. As noted above, a particular system can comprise a different number of mineral processing stations and corresponding modifications to slime flow conduit system 108 follow from the teachings herein.

Thickening tank 110 can comprise a tank structure 140, a central inlet 142, a clarified water outflow 144 and a tailings outflow 146. Tank structure 140 can have a suitable volume for the particular mining operation size. Central inlet 142 provides an interface with combined flow conduit 136 such that slime can enter the tank structure 140. Central inlet 142 can be simply an end opening of combined flow conduit 136, but in some embodiments, central inlet 142 can comprise a circular ring like structure with optional mechanical mixing to provide for a mixed slime flow into tank structure 140 to facilitate flocculation. In the thickening process that takes place in tank structure 140, the flocculates solids have a higher density and fall to the bottom of the tank, and less dense clarified water can be found near the top of the tank. Clarified water outflow 144 can be configured to take off water from near the top of the tank, such as the top 20%-40% of the tank volume and in further embodiments the top 10% of the tank volume, and in general near the edge of the tank. Similarly, tailings outflow 146 can be configured to withdraw concentrated tailings from the flocculation process near the bottom of the tank and in some embodiments toward the center of the tank, in some embodiments from the bottom 20% of the tank volume and in further embodiments from the bottom 10% of the tank volume. A person of ordinary skill in the art will recognize that additional ranges of positions for water removal within the explicit ranges above are contemplated and are within the present disclosure.

Referring to FIG. 1, polymer flocculant delivery system 112 comprises a polymer suspension reservoir 150 that can comprise a mixer to maintain a relatively homogenous form of the suspension, a mixing/dilution tank 152, a storage tank 154 and feed lines 156. Polymer suspension reservoir 150 generally holds a desired quantity of the selected polymer blend and can comprise a feed valve 158 or the like to provide for the placement of a selected amount of polymer into mixing/dilution tank. Polymer suspension reservoir generally can provide continuous mixing of the polymer suspension so that a homogenous polymer suspension can be meter out of the reservoir. Mixing/dilution tank 152 generally has an appropriate mixing element and can be configured generally to operate in a batch or continuous mode of operation. Water is generally correspondingly delivered into mixing/dilution tank 152 to provide a desired concentration of polymer solution, as described above. The mixed polymer solution can be pumped or otherwise flowed for storage to storage tank 154 for delivery as needed to the waste stream through feed lines 156. In alternative embodiments generally for the delivery of a suspension comprising polyDadmac, polymer suspension reservoir 150 can be configured for direct delivery of polymer suspension into feed lines 156 or a portion thereof. Referring to FIG. 1, a mixing flocculant reservoir 157 is configured for direct delivery of a flocculant suspension through line 159 to head box 124, which can be, for example, desirable for the delivery of a suspension of polyDadmac or copolymers thereof.

Feed lines 156 provide for flow from storage tank 154 to slime flow conduit system 108, and pumps can be used as appropriate to drive the flow. As shown in FIG. 1, feed lines 156 comprise 5 branch feeds 160, 162, 164, 166, 168 from main feed line 169, which connects with storage tank 154. The feed lines can be appropriate pipes or other conduits. Branch feeds 160, 162, 164, 166, 168 connect between main feed line 169 and delivery connections 180, 182, 184, 186, 188 that connect with corresponding points of the slime flow conduit system. As shown in FIG. 1, delivery connection 180 is located at head box 124, delivery connection 182 is on flow conduit 132, delivery connections 184, 186 are located at different points on combined flow conduit 136, and delivery connection 188 is located at central inlet 142. In additional or alternative embodiments, a different number of branch flow conduits can be used, such as 1, 2, 3, 4, 6 or more than 6, and the positions of the delivery connections can be altered as desired. Similarly, a system can comprise more than 1 polymer flocculant delivery system if desired to supply polymer solution to various delivery connections.

As noted above, based on the improved polymer blends described herein the solution of the polymer blend can be effectively added at selected locations along the slime flow. While polyethylene oxide alone as a flocculant has desirable properties, the flocculant action of the polyethylene oxide is most effective when the flocculant solution is added essentially at the central inlet into the thickening tank, e.g., delivery connection 188 in FIG. 1. The delivery of a polymer flocculant solution at or near the central inlet limits the mixing with the waste stream prior to entry into the thickening tank. It has been discovered that some flocculant polymer blends described herein provide for earlier introduction into the waste flow to provide better mixing with the waste flow. Overall the polymer blends provide outstanding flocculant function and improved delivery flexibility. In contrast with high molecular weight polyethylene oxide alone, flocculant polymer blends can be delivered effectively through a delivery port into the slime flow at least 10 meters from the port connecting the waste flow with the thickening tank settling zone, in further embodiments at least about 12 meters and in additional embodiments from 15 meters to the initiation of the waste flow adjacent to the mineral processing station. A person of ordinary skill in the art will recognize that additional ranges of distances within the explicit ranges above are contemplated and are within the present disclosure.

While the polymer flocculants can be effectively used in various waste processing situations, it is instructive to review a representative procedure. For example, a slime flow coming from the mineral processing stations can have a solids concentration from about 1 weight percent to about 12 weight percent. The objective can be to concentrate to solids in the waste to levels generally from about 15 to about 45 weight percent and in further embodiments from about 20 to about 35 weight percent in the under flow removed from the thickening tank. The clarified water removed from the thickening tank can have at least about 90 percent, in some embodiments at least about 95 percent, and in further embodiments at least about 99 of the initial solids removed. In general, the volume of polymer flocculant solution is added in a dosage from about 1 parts per million by weight (ppm) to about 50 ppm, in some embodiments from about 5 ppm to about 40 ppm, and in further embodiments from about 10 ppm to about 30 ppm of polymer flocculant within the treated slime flow, i.e., 1 part polymer per million parts of waste water by weight assuming that the waste water is 1 kg per liter. A person of ordinary skill in the art will recognize that additional ranges of processing parameters within the explicit ranges above are contemplated and are within the present disclosure. The improved polymer blends and/or the improved delivery of the polymer blends provide for a reduced use of polymer in order to achieve a desired high purity of water effluent.

In addition to cleaning mining sewage, the flocculant polymers can be effectively used in other waste water treatment context, such as to remove fibrous particulates from waste streams. Thus, flocculant polymers can be effectively used for waste water treatment from paper mills and the like. Paper mill dewatering processes can be performed to form fiber cakes that can be recycled into useful materials. Thickening of fiber sludge can be performed by filtration or sedimentation, such as with clarifiers or floatation units. To facilitate cake formation, the dewatering process can involve screw presses, belt presses, centrifuges or other dewatering of waste fibers. A fiber cake can have a solid content of at least about 20 weight percent and in some embodiments at least about 25 weight percent. The initial sludge can have a solid content generally from roughly 1 weight percent to about 15 weight percent. The use of flocculant polymers generally for the treatment of waste streams from paper mills, pulp mills or deinking plants is described generally in U.S. Pat. No. 6,123,856 to Kumpera et al., entitled "Dewatering of Sludges," incorporated herein by reference.

Furthermore, flocculant polymers can be useful as fiber retention agents in paper making processes and the like for fiber materials. Paper is formed on a screen or the like where the fibrous material is dewatered to form the paper. The retention of fibers in the paper both increases yield of the paper product and reduces fiber particulates in the mill waste stream, which can increase the clean up burden. Thus, small quantities of the flocculant polymers can be combined with the paper forming material to reduce fiber loss from the material during dewatering. The use of cationic or anionic polyacrylamide polymers to aid in paper dewatering is described in U.S. Pat. No. 4,795,531 to Sofia et al., entitled "Method for Dewatering Paper," incorporated herein by reference. To improve the dewatering aid, a portion of high molecular weight PEO can be combined with the polyacrylamide to form a flocculant polymer blend. The blend can comprise from about 1 weight percent to about 40 weight percent PEO, in other embodiments from about 5 weight percent to about 38 weight percent PEO and in further embodiments from about 10 weight percent to about 35 weight percent PEO, and in some embodiments the remainder of the flocculant polymer can be cationic polyacrylamide. A person of ordinary skill in the art will recognize that additional ranges of PEO polymer in a blend of flocculant polymers within the ranges above are contemplated and are within the present disclosure.

Suspended samples of high molecular weight PEO polymers alone or mixed with polyacrylamide (PAM, 30% anionic) were prepared with PEG 400 suspending liquid.

Figure 2:
FIG. 2 is a side view of 7 samples of flocculant polymers in a suspension following settling.

Several different brands of high molecular PEO were tested with similar results. The samples are mixed in a jar and allowed to settle. When mixed the suspensions produced a liquid that was uniform to visual inspection. The polymer particles gradually settled toward the lower portion of the jar. FIG. 2 shows seven samples following settling, which was observed to generally take place over roughly 5-7 hours. The composition of these samples in weight percent is as follows from left to right.
1. 70% PEG 400, 15% PEO, 15% PAM
2. 82% PEG 400, 18% PEO
3. 80% PEG 400, 20% PEO
4. 70% PEG 400, 30% PEO
5. 80% PEG 400, 10% PEO, 10% PAM
6. 80% PEG 400, 10% PEO, 10% PAM
7. 80% PEG 400, 20% PEO After settling, the polymers could be easily re-suspended into a visually homogenous liquid through simple swirling of the jars. After re-suspension, the polymer would then settle again over the course of several hours.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A suspension comprising flocculant polymer that is particulate and water soluble and has an average molecular weight of at least about 200,000 g/mol and a liquid polyether polyol having a molecular weight from about 150 g/mol to about 1,000 g/mol and a viscosity of the liquid polyether polyol alone at 25° C. of no more than about 500 cP, wherein the suspension has a concentration of flocculant polymer from about 1 weight percent to about 60 weight percent and at least about 40 weight percent liquid polyether polyol and wherein the flocculant polymer comprises polyethylene oxide having an average molecular weight of at least about 6 million g/mol and is not dissolved in the suspension, and wherein the liquid portion of the suspension has a concentration of at least about 80 weight percent liquid polyether polyol.

2. The suspension of claim 1 wherein the liquid polyether polyol comprises polyethylene glycol having a molecular weight from about 200 g/mol to about 700 g/mol.

3. The suspension of claim 1 wherein the flocculant polymer comprises polyacrylamide, polyDadmac, copolymers thereof or a combination thereof with an average molecular weight of at least about 1 million g/mol.

4. The suspension of claim 1 wherein in the flocculant polymer comprises polyacrylamide having an average molecular weight of at least 22.5 million g/mol, wherein the weight ratio of polyethylene oxide to polyacrylamide is from about 0.667 to about 5.

5. The suspension of claim 1 having a viscosity of no more than about 1000 cP.

6. The suspension of claim 1 having a concentration of flocculant polymer from about 10 weight percent to about 50 weight percent.

7. The suspension of claim 6 having a concentration of at least about 90 weight percent polyol, wherein the polyol comprises the polyethylene oxide and the liquid polyether polyol.

8. The suspension of claim 1 wherein the polyethylene oxide has an average diameter of no more than about 75 microns.

9. The suspension of claim 1 wherein the liquid polyether polyol comprises polyethylene glycol with an average molecular weight from about 300 g/mol to about 650 g/mol.

10. The suspension of claim 1 wherein the liquid polyether polyol comprises polyethylene glycol with a viscosity of no more than about 400 cP.

11. A suspension comprising flocculant polymer that is particulate and water soluble and has an average molecular weight of at least about 200,000 g/mol and a liquid polyether polyol having a molecular weight from about 150 g/mol to about 1,000 g/mol and a viscosity of the liquid polyether polyol alone at 25° C. of no more than about 500 cP, wherein the suspension has a concentration of flocculant polymer from about 1 weight percent to about 60 weight percent and at least about 40 weight percent liquid polyether polyol and wherein the flocculant polymer comprises polyethylene oxide having an average molecular weight of at least about 1 million g/mol and is not dissolved in the suspension, and wherein the liquid portion of the suspension has a concentration of at least about 80 weight percent liquid polyether polyol, wherein the flocculant polymer comprises polyDadmac having an average molecular weight of at least 100,000 g/mol, wherein the suspension has a weight ratio of polyethylene oxide to polyDadmac from about 0.667 to about 5.

12. A suspension comprising flocculant polymer that is particulate and water soluble and has an average molecular weight of at least about 200,000 g/mol and a liquid polyether polyol having a molecular weight from about 150 g/mol to about 1,000 g/mol and a viscosity of the liquid polyether polyol alone at 25° C. of no more than about 500 cP, wherein the suspension has a concentration of flocculant polymer from about 1 weight percent to about 60 weight percent and at least about 40 weight percent liquid polyether polyol and wherein the flocculant polymer comprises polyethylene oxide having an average molecular weight of at least about 1 million g/mol and is not dissolved in the suspension, wherein the flocculant polymer comprises polyDadmac having an average molecular weight of at least 100,000 g/mol, wherein the suspension has a weight ratio of polyethylene oxide to polyDadmac from about 0.667 to about 5.

13. The suspension of claim 12 wherein the liquid polyether polyol comprises polyethylene glycol having a molecular weight from about 200 g/mol to about 700 g/mol.

14. The suspension of claim 12 having a concentration of flocculant polymer from about 10 weight percent to about 50 weight percent.

15. The suspension of claim 12 wherein the polyethylene oxide has an average diameter of no more than about 75 microns.

16. The suspension of claim 12 wherein the liquid polyether polyol comprises polyethylene glycol with an average molecular weight from about 300 g/mol to about 650 g/mol.

17. The suspension of claim 12 wherein the liquid polyether polyol comprises polyethylene glycol with a viscosity of no more than about 400 cP.

* * * * *